(12) United States Patent
Brillouet

(10) Patent No.: US 7,481,530 B2
(45) Date of Patent: Jan. 27, 2009

(54) GLASSES COMBINED WITH SUN/WIND SCREENS

(76) Inventor: Yong Chu K. Brillouet, 16215 Vistaa Point La., Canyon Country, CA (US) 91387

( * ) Notice: Subject to any disclaimer, the term of this patent is extended or adjusted under 35 U.S.C. 154(b) by 45 days.

(21) Appl. No.: 11/810,150

(22) Filed: Jun. 5, 2007

(65) Prior Publication Data

US 2008/0304007 A1    Dec. 11, 2008

(51) Int. Cl.
*G02C 1/00* (2006.01)
(52) U.S. Cl. .................. 351/158; 351/44; 2/12
(58) Field of Classification Search .......... 351/41, 351/44, 48, 58, 158; 2/12, 13
See application file for complete search history.

(56) References Cited

U.S. PATENT DOCUMENTS 6,557,995 B1 * 5/2003 Edwards ............ 351/47
6,988,798 B1 * 1/2006 Duffie ............ 351/44

\* cited by examiner

*Primary Examiner*—Huy K Mai

(57) ABSTRACT

A glasses combined with retractable screens is provided. The glasses combined with retractable screens is comprised of a frame of glasses that has void space therein. Small spring re-winders are installed inside of both of legs of the glasses frame and inside of upper glasses frame and lower glasses frames that surround lenses. Screens such as veil, scarf, satin, and gauze etc., are engaged to the re-winders. When the wearer is exposed to strong sun light or winds, she/he drags small pulls, which are small metal hooks and attached at one end of the screen, out of the frame and fix it to proper means, such as tie to other pull or fix it with hair pin. Screens come out of lower part of legs of the glasses frame cover cheeks of the wearer. Screens come out of upper part of legs of the glasses frame cover side of hair of the wearer. Screen comes out of the upper glasses frame covers front upper part of the face of the wearer including hair. Screens come out of lower part of glasses frames that surround the lenses cover lower front of wearer's face.

4 Claims, 11 Drawing Sheets

GLASSES COMBINED WITH SUN/WIND SCREENS

FIELD OF THE INVENTION

Current application relates to a glasses combined with screens, especially relates to a glasses equipped with retractable screens to cover lower and upper part of face from strong sun light and winds.

BACKGROUND OF THE INVENTION

When people go out side on a sunny day, many of them wear sun-glasses to protect their eyes from the strong sun light. However, conventional sun-glasses can shades only small portion of the wearers face around eyes. Therefore, long time exposure to strong sun light, such as playing golf, picnic, gardening, often leaves tanned mark to face of the wearer. Even though sun shade cream may fades out such tanned mark, it is not convenient to paste cream and wipe it out. Such tanned mark is not desirable especially for ladies. Therefore, they usually wear sun visors or hats in addition to sun-glasses. Still the sun visors can not protect wearer's face from ultra-violet rays that reflected by the ground and air. So, they cover the sun visor or hats with towels or scarf. That is extremely uncomfortable and looks odd. If wind blows, the sun visors and hats will blow away. It is the purpose of the current application to provide a more convenient means that protects wearer's eye and face skin at the same time from strong sun lights and winds simultaneously. The glasses combined with sun/wind screens according to current application not only protects wearer's face from strong sun lights but also protects wearer's hair from tangling by the wind.

DESCRIPTION OF THE PRIOR ART

U.S. Pat. No. 5,956,119 to Gibbs illustrates a positionable face mask support for attaching to a pair of glasses. The positionable face mask support is adaptable to be used with any pair of glasses for protecting individuals who work with bodily fluids of humans or animals from direct contact with such fluids. The positionable face mask support comprises attachments, releasable latching members and biasing means for attaching to the face mask and allowing the face mask to be positioned in one of a plurality of positions ranging from being against a wearer's face to being substantially lifted away from the wearer's face. The mask support further comprises flexible members depending there from for attaching to cheek portions of the face mask and for conforming to the wearer's face.

U.S. Pat. No. 5,278,999 to Brown, et al. illustrates an improved combined ear and eye protector is disclosed which provides optimum flexibility by permitting the use of both eye and ear protection, or alternatively eye protection only or ear protection only. Maximum flexibility is achieved by providing an ear protection system which includes a head support independent of the eye protector.

U.S. Pat. No. 4,944,039 to Dietrich illustrates a protective face mask attachable to glasses. The mask comprises a thin frame generally formed to cross transversely over the bridge of the nose, below the eyes and across the cheeks of the user; a protective cover attached to the frame and extending freely there from to hang in front of the nose and mouth of the user; and attachment hooks for attaching the frame to the glasses.

U.S. Pat. No. 4,843,643 to Parissenti, et al. illustrates a protective visor, particularly for dentists, composed of a shield supported by a supporting element having bar elements connectable to the rods of a pair of spectacles or the like.

U.S. Pat. No. 4,821,340 to Johnson illustrates a face shield to protect an individual against inhaling germs and other foreign bodies comprising a permanent clip portion which is adapted to be mounted on the nose piece of a pair of eye-glasses and a disposable sheet of relatively thin rigid plastic which is remove-ably attached to the clip. This enables the sheet to be removed and discarded after a single use and replaced by an identical sheet prior to treatment of a new patient.

U.S. Pat. No. 3,991,753 to Viescay Viesca illustrates a device for preventing an individual from inhaling germs, foreign bodies, and the like. The device includes only a single sheet of a relatively light-weight plastic material which has an outer convex surface area and an opposed inner concave surface area defining for the sheet a hollow interior space adapted to receive the nose, mouth, and chin of an individual, with the sheet having connected thereto a structure for mounting the sheet on the head of the individual in such a way that while the nose, mouth, and chin of the individual are in the hollow interior of the sheet nevertheless the nose, mouth, and chin do not engage the inner surface area of the sheet.

U.S. Pat. No. 3,298,032 to Sielisch illustrates a snap-on lift front lens that is mounted on a frame of glasses. The snap-on lens is a sheet of lens that is pivotally mounted on a frame of glasses by a spring wire. The sheet type lens is larger than the frame of the glasses and may cover some part of face of wearer.

U.S. Pat. No. 3,298,031 to Morgan illustrates a safety face mask. The mask is separably connected to a goggle to cover the lower part and upper part of the face of a wearer.

None of the prior art illustrates a retractable face shield that comes out of the legs of a glasses to shade the face of a wearer when the sun is too hot or wind is strong to protect the wearer's face.

SUMMARY OF THE INVENTION

When people go out side on a sunny day, many of them wear sun-glasses to protect their eyes from the strong sun light. However, conventional sun-glasses can shades only small portion of the wearers face around eyes. Therefore, long time exposure to strong sun light, such as playing golf, picnic, gardening, often leaves tanned mark to face of the wearer. Even though sun shade cream may fades out such tanned mark, it is not convenient to paste cream and wipe it out. Such tanned mark is not desirable especially for ladies. Therefore, they usually wear sun visors or hats in addition to sun-glasses. Still the sun visors can not protect wearer's face from ultra-violet rays that reflected by the ground and air. So, they cover the sun visor or hats with towels or scarf. That is extremely uncomfortable and looks odd. If wind blows, the sun visors and hats will blow away. It is the purpose of the current application to provide a more convenient means that protects wearer's eye and face skin at the same time from strong sun lights and winds simultaneously. Small spring re-winders are installed inside of both of legs of the glasses frame and inside of upper glasses frame and lower glasses frames surround lenses. Screens such as veil, scarf, satin, and gauze etc., are engaged to the re-winders. When the wearer is exposed to strong sun light or winds, she/he drags small pulls, which is attached at one end of the screen, out of the frame and fix it to proper means, such as tie to other pull or fix it with hair pin. Screens come out of lower part of legs of the glasses frame cover cheeks of the wearer. Screens come out of upper part of legs of the glasses frame cover side of hair of the wearer. Screen comes out of the upper glasses frame covers front upper part of the face of the wearer including hair. Screens come out of lower part of glasses frames that surround the lenses cover lower front of the wearer's face.

DETAILED DESCRIPTION OF THE PREFERRED EMBODIMENT

Figure 1:
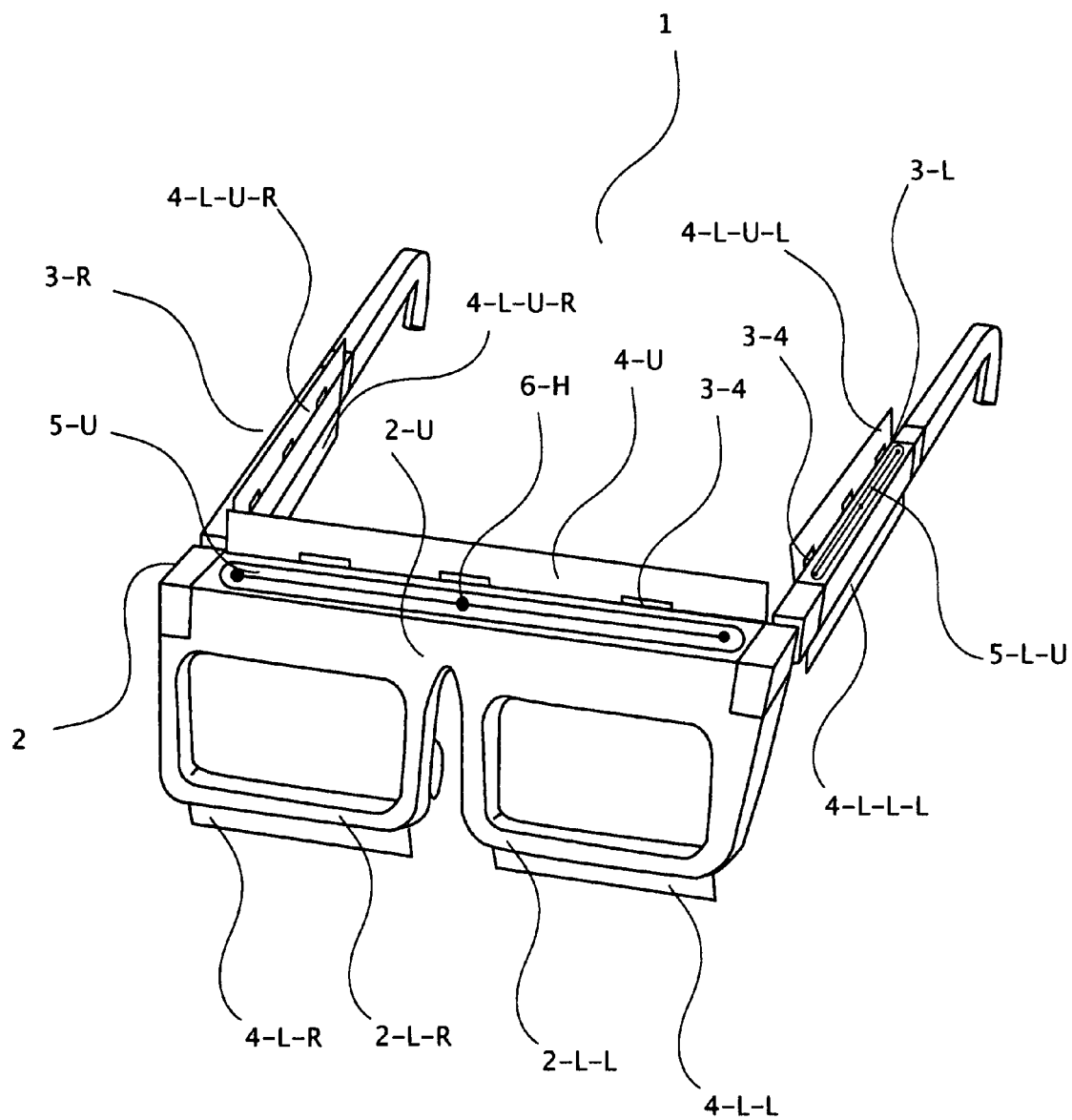
FIG. 1 is a perspective view of a glasses combined with sun/wind screens according to current application, when the screens are retracted inside of frame of the glasses.

FIG. 1 is a perspective view of glasses (1) combined with sun/wind screens according to current application, when the screens are retracted inside of frame (2) of the glasses. Appearance of the glasses (1) according to current application is almost same as conventional glasses. The glasses (1) has front frame (2) and legs (3). The legs (3) are divided into left leg frame (3-L) and right leg frame (3-R). The front frame (2) is divided into upper glasses frame (2-U) and lower glass frame (2-L). The lower glass frame (2-L) is divided into a left lower glass frame (2-L-L) and a right lower glass frame (2-L-R).

Upper face of the upper glasses frame (2-U) is covered with a solid upper cover (4-U) that is rotatably attached to the upper glasses frame (2-U) via three hinges (3-4) to hide an upper slit (5-U) and small front head pulls (6-F-F), which are installed inside of upper glass frame (2-U). All pulls (6) are small metal hook and attached on one end of each screens.

Lower face of the left lower glasses frame (2-L-L) is covered with a solid lower cover (4-L-L) to hide a left lower slit (5-L-L) and small front face pulls (6-F-F), which are installed inside of the left lower glass frame (2-L-L). The front face pulls (6-F-F) are small hooks. Lower face of the right lower glasses frame (2-L-R) is covered with a solid lower cover (4-L-L) to hide a right lower slit (5-L-R) and small front face pulls (6-F-F), which are installed inside of the right lower glass frame (2-L-R).

Figure 2:
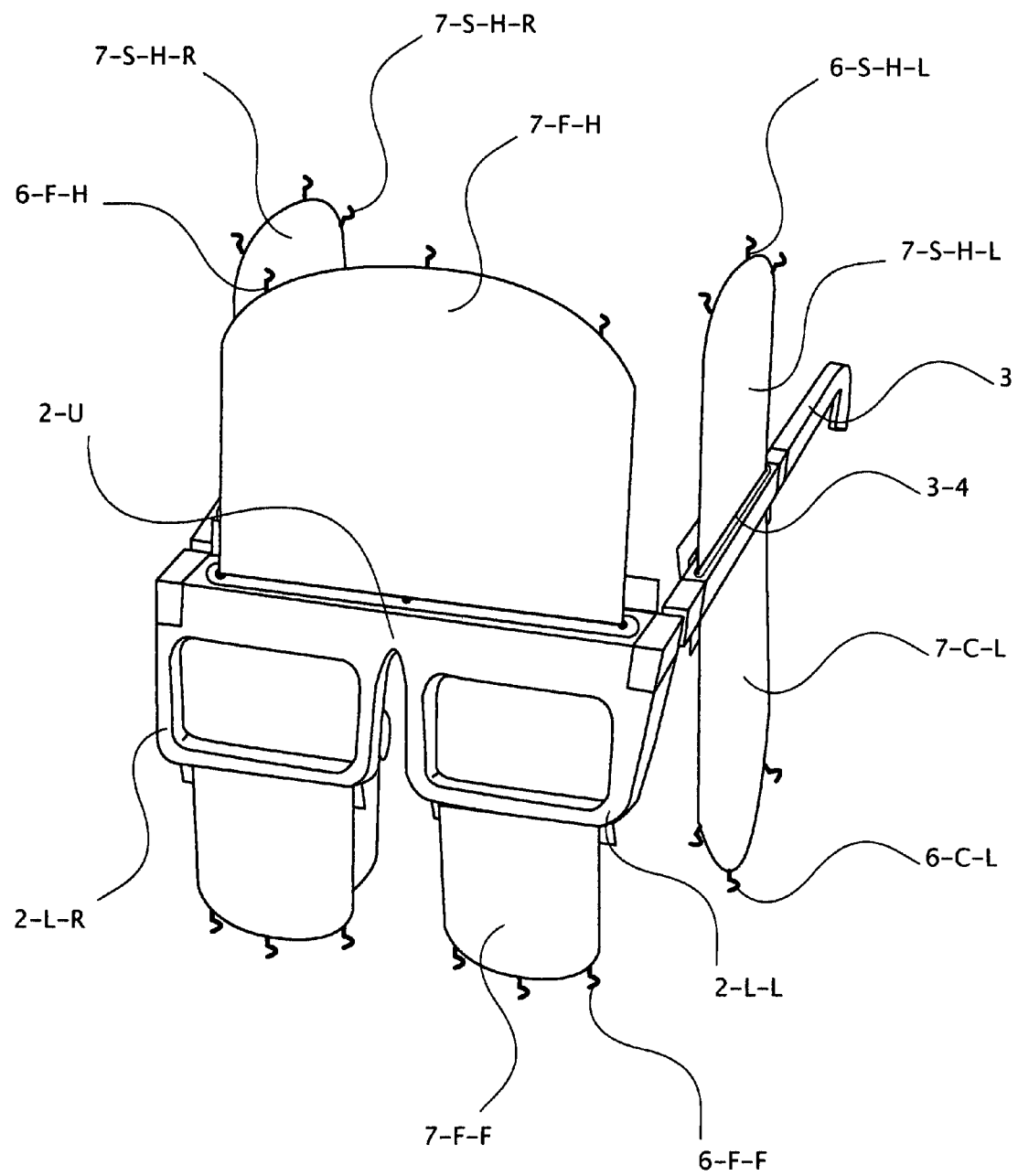
FIG. 2 is a perspective view of the glasses combined with sun/wind screens according to current application, when the screens are deployed outside of the glasses.

FIG. 2 is a perspective view of the glasses (1) combined with sun/wind screens (7) according to current application, when the sun/wind screens (7) are deployed outside of the frame (2) of the glasses (1).

Front hair covering sun/wind screen (7-F-H) comes out of the upper glass frame (2-U). The front hair covering sun/wind screen (7-F-H) may be a resilient gauze, scarf, satin, and veil, etc. Various kinds of drawings, logos, trademarks can be printed thereon for decoration. Wearers fix front hair pulls (6-F-H), attached on one end of the front hair covering screen (7-F-H), to their hair with hair pin.

Side hair covering screens (7-S-H-L) and (7-S-H-R) come out of upper face of leg frames (3-L) and (3-R) respectively. The side hair covering sun/wind screen (7-S-H-L) and (7-S-H-R) may be a resilient gauze, scarf, satin, and veil, etc. Various kinds of drawings, logos, trademarks can be printed thereon for decoration. Wearers fix the side hair pulls (6-S-H-L) and (6-S-H-R), attached on one end of the front hair covering screens (7-S-H-L) and (7-S-H-R), to their hair with hair pin or tie to other side hair pulls that comes from on the other side of the wearer's face.

Cheek covering sun/wind screens (7-C) come out of lower face of the legs (3) of the frame (2). The cheek covering screens (7-C) may be resilient gauze, scarf, satin, and veil, etc. Various kinds of drawings, logos, trademarks can be printed thereon for decoration. Wearers fix cheek pulls (6-C), attached on one end of the cheek covering screen (7-C), by tying to other cheeks pulls attached to one end of the other cheek covering screen comes from opposite side of face. Front face covering screens (7-F-F) come out of the lower face of the lower glass frames (2-L-L) and (2-L-R). The front face covering screens (7-F-F) may be resilient gauze, scarf, satin, and veil, etc. Various kinds of drawings, logos, trademarks can be printed thereon for decoration. Wearers fix front face pulls (6-F-F), which are small hooks attached on one end of the front face covering screen (7-F-F), to the cheek covering screens (7-C).

Figure 3:
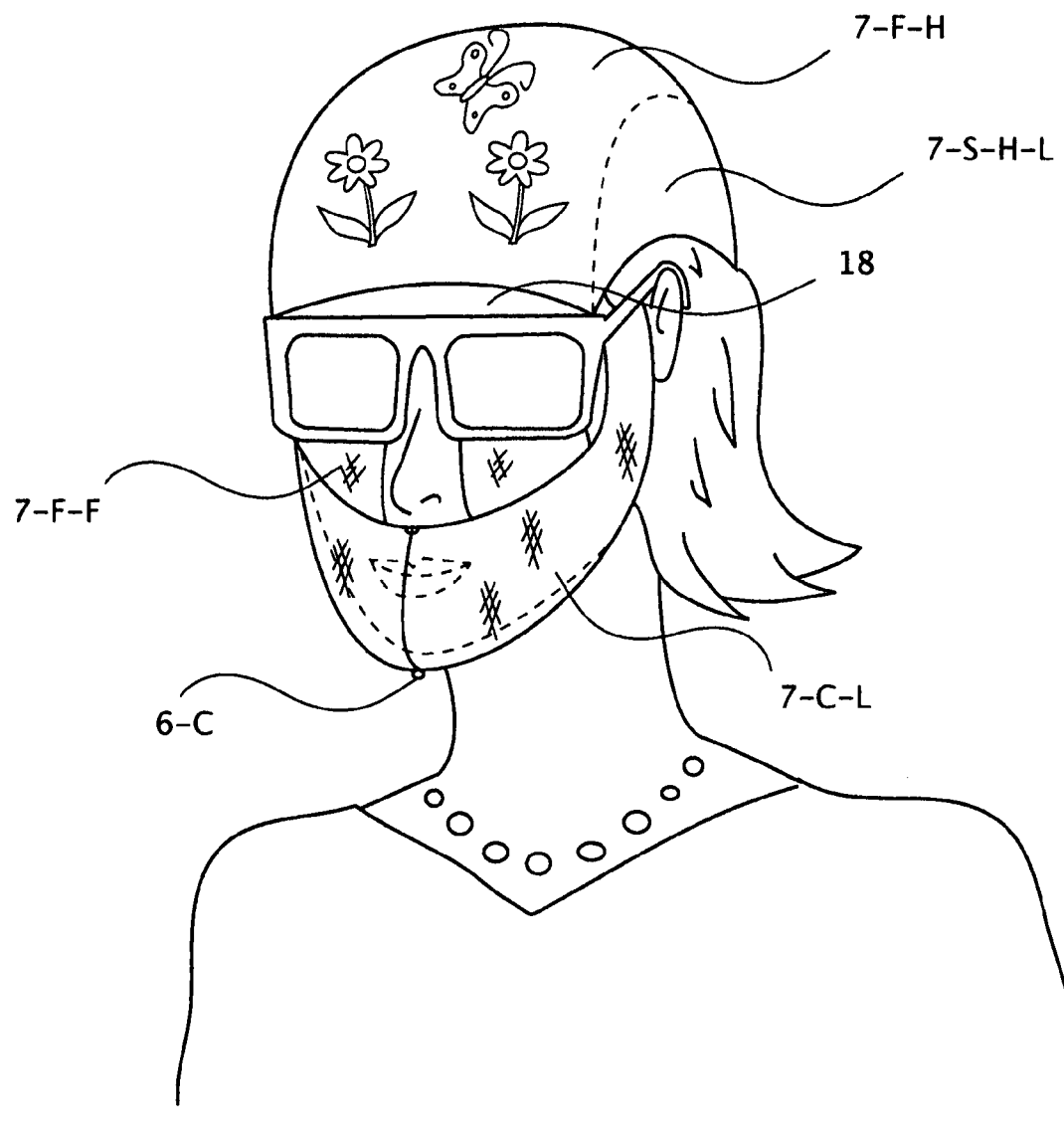
FIG. 3 is a perspective view of the glasses combined with sun/wind screens according to current application worn by a wearer and the screens are deployed to cover face and head of the wearer.

FIG. 3 is a perspective view of the glasses (1) combined with sun/wind screens according to current application worn by a wearer and the screens are deployed to cover face and head of the wearer.

When a wearer put on the glasses (1) according to current application, deploy the hair covering screens (7-F-H), (7-S-H) and fix them to his/her hair, a gap (18) is developed on fore head of the wearer due to the resiliency of the screen. Then the appearance of the wearer's head looks like wearing a scarf. The hair covering screens (7-F-H), (7-S-H) not only shade the sun light but also protects the wearer's hair from tangling.

The cheek covering screens (7-C) are fixed by tying cheek pulls (6-C) each other that are attached on the opposite cheek covering screen. User can cover desired part of his/her lower front face by pulling the cheek covering screens (7-C) upward due to the resiliency of the composing material. The cheek covering screens (7-C) not only shades the sun light but also protect the wearer's skin from dry up by the wind. The front face screens (7-F-F) cover the malar area of the wearer from sun light.

Figure 4:
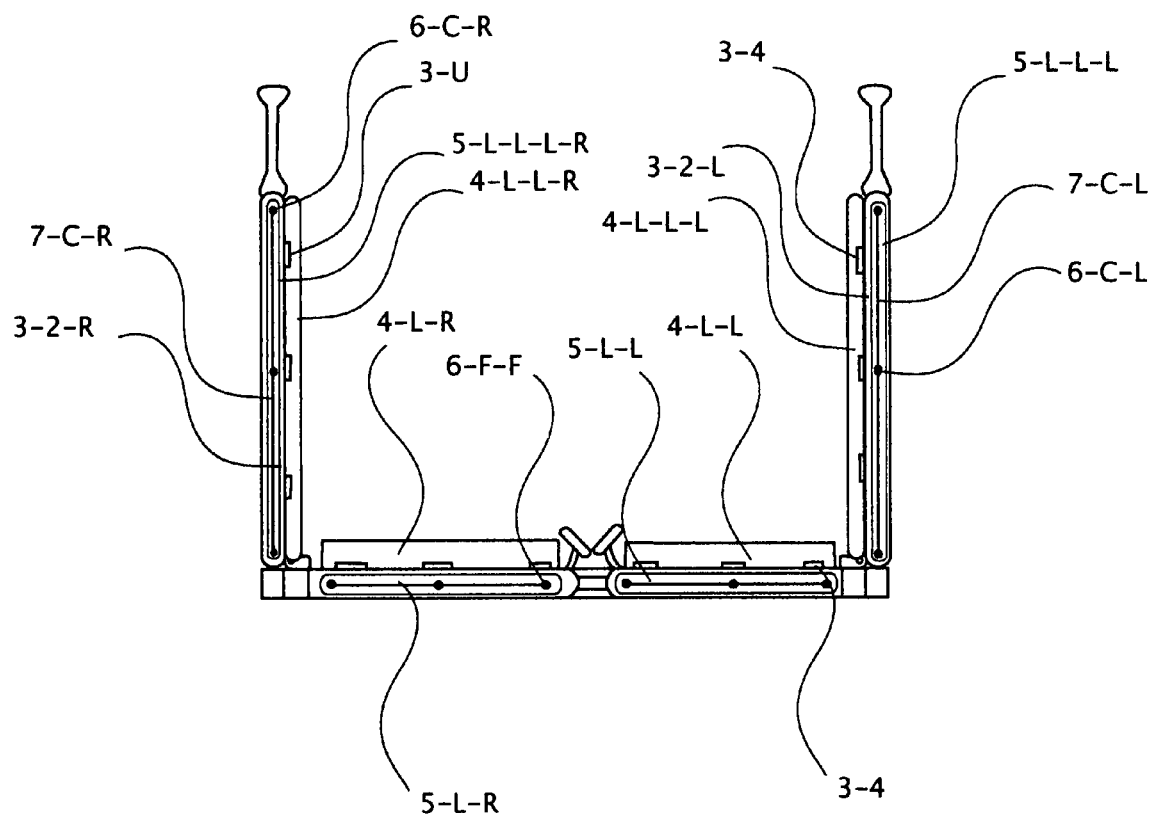
FIG. 4 is a bottom view of the glasses combined with sun/wind screens according to current application, when the screens are retracted inside of the glasses.
Figure 5:
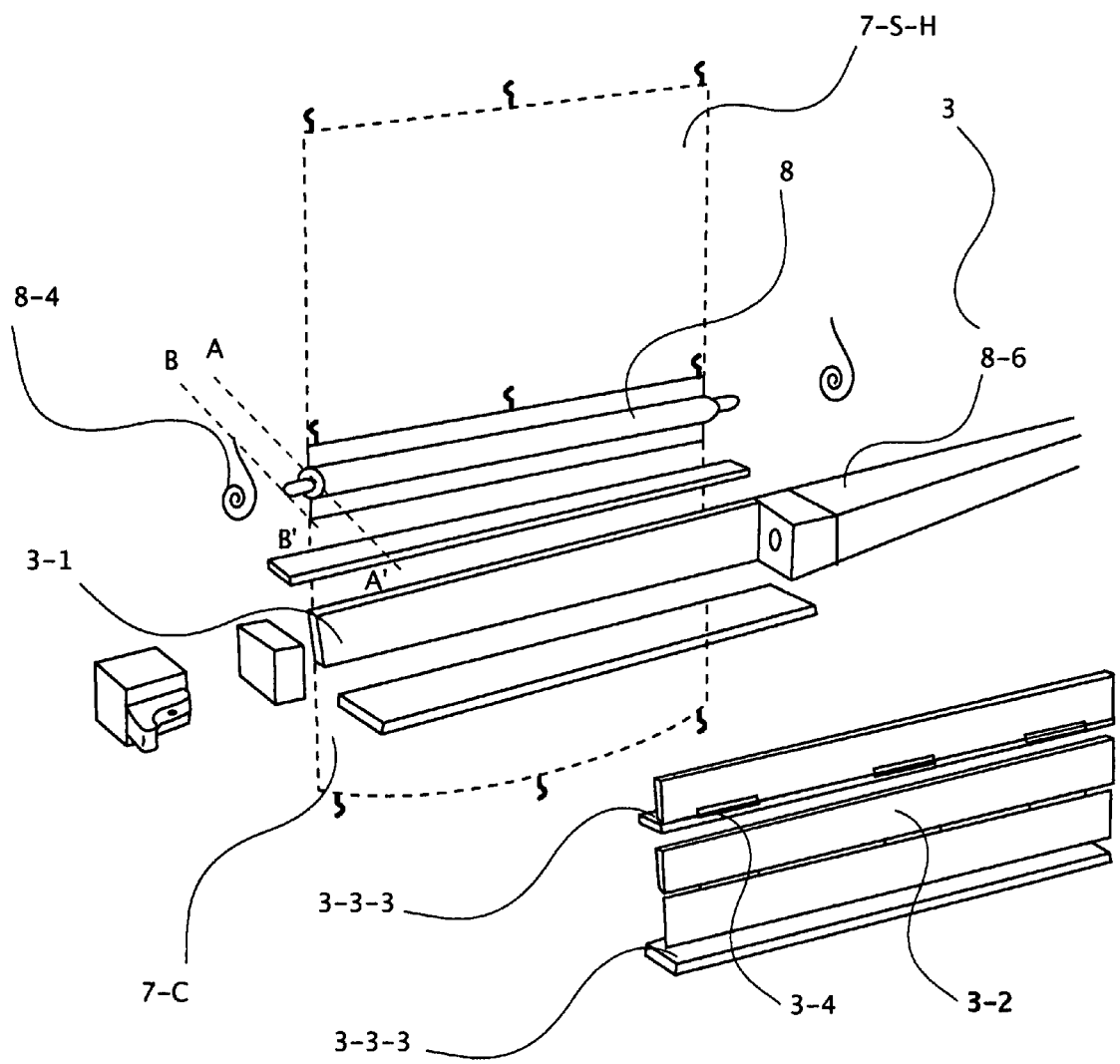
FIG. 5 is an exploded view of leg of the glasses combined with sun/wind screens according to current application, showing rewinding and deploying system installed inside of the leg thereof.

FIG. 4 is a bottom view of the glasses (1) combined with sun/wind screens of current application, when the cheek covering screens (7-C) and front face covering screens (7-F-F) are retracted inside of the glasses and FIG. 5 is an exploded view of leg (3) of the glasses (1) combined with sun/wind screens according to current application, showing rewinding and deploying system (8) installed inside of the leg (3) thereof.

Each leg frame, (3-L) and (3-R), has a void space (3-1) that is formed by assem-bling two broad plates (3-2) and four narrow plates (3-3).

Two narrow plates (3-3) are placed on the lower face of left leg frame (3-L) to form a lower left leg slit (5-L-L-L) through which left cheek covering screen (7-C-L) comes in and out thereof. Another two narrow plates (3-3) are placed on the upper face of the left leg frame (3-L) to form an upper left leg slit (5-L-U-L) through which the left side hair covering screen (7-S-H-L) comes in and out thereof.

Two narrow plates (3-3) are placed on the lower face of the right leg frame (3-R) to form a lower right leg slit (5-L-L-R) through which right cheek covering screen (7-C-R) comes in and out thereof. Another two narrow plates (3-3) are placed on the upper face of the right leg frame (3-R) to form an upper right leg slit (5-R-U) through which the right side hair covering screen (7-S-H-R) comes in and out thereof.

Figure 6:
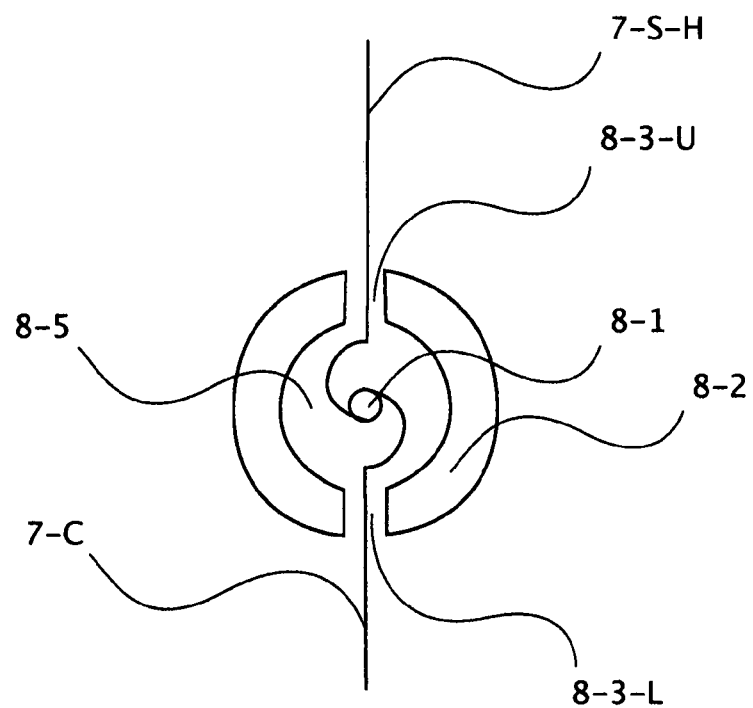
FIG. 6 is an enlarged cross-sectional view of rewind and deploying system seen along the line A-A' in FIG. 5.
Figure 7:
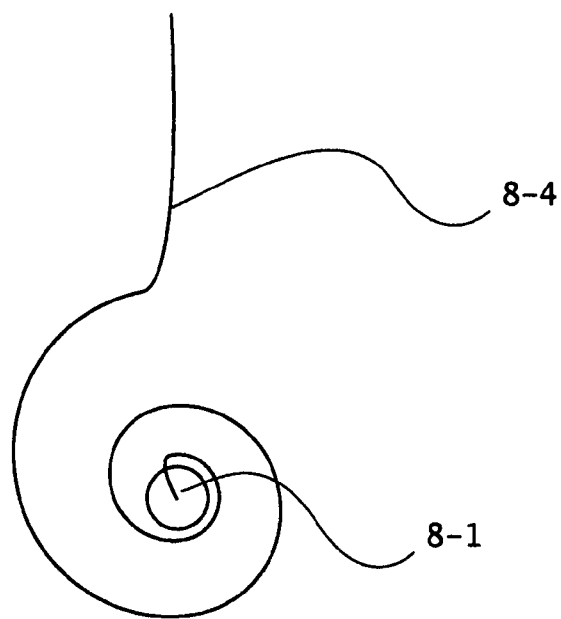
FIG. 7 is an enlarged cross-sectional view of rewind and deploying system seen along the line B-B' in FIG. 5.

FIG. 6 is an enlarged cross-sectional view of rewind and deploying system (8) seen along the line A-A' in FIG. 5. And FIG. 7 is an enlarged cross-sectional view of rewind and deploying system (8) seen along the line B-B' in FIG. 5. The rewinding and deploying system (8) is comprised of one center shaft (8-1), to which one cheek screen (7-C) and one side hair covering screen (7-S-H) are firmly attached, one hollow tube (8-2) that has two long slits (8-3-L), (8-3-U) along the length thereof, through which the cheek covering screen (7-C) and side hair covering screen (7-S-H) come out respectively, and two swirled ribbon springs (8-4) that are installed on both ends of the center shaft (8-1). A space (8-5) is developed between the center shaft (8-1) and the hollow tube (8-2) to receive the wound cheek covering screen (7-C) and side hair covering screen (7-S-H). One swirled ribbon spring (8-4) on one end of the center shaft (8-1) is engaged to a hole (8-6) that is developed inside of one narrow end of the space (3-1). Other swirled ribbon spring (8-4) on other end of the center shaft (8-1) are engaged to another hole (8-6) that is developed inside of other narrow end of the space (3-1). Lower leg slits (5-L-L-L), (5-L-L-R) and cheek pulls (6-C-L), (6-C-R) are covered with lower leg cover (4-L-L-L), (4-L-L-R). Left lower leg covers (4-L-L-L) is rotate-ably attached to one of left broad plates (3-2-L), which faces the wearer's face, via three hinges (3-4) and the right lower leg cover (4-L-L-R) is rotate-ably attached to one of right broad plates (3-2-R), which faces the wearer's face, via three hinges (3-4).

Figure 8:
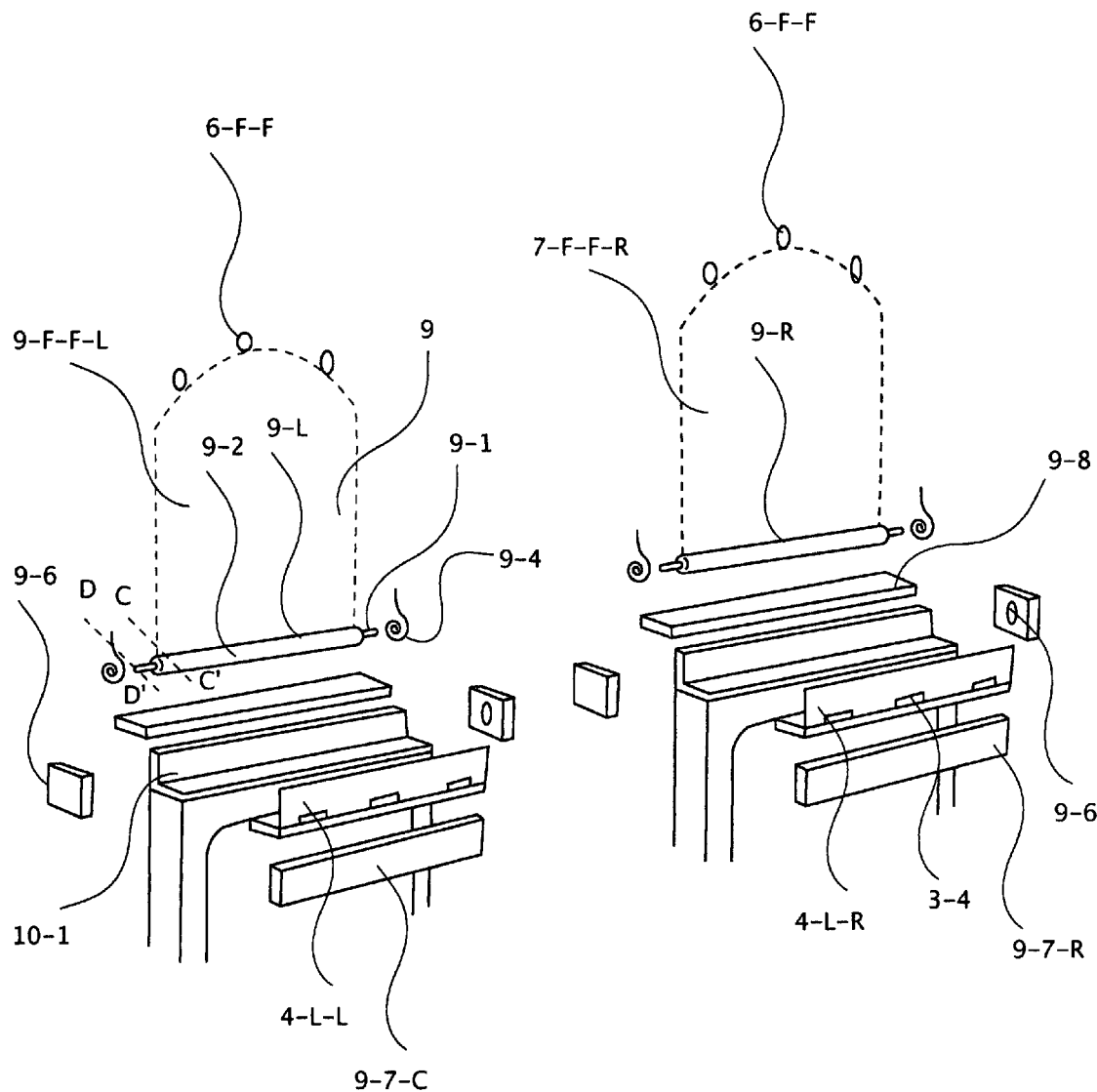
FIG. 8 is an exploded view of lower glass frame that surround the lenses combined with sun/wind screens according to current application, showing rewinding and deploying system installed inside of the leg thereof.

FIG. 8 is an exploded view of lower of glasses frames (2-L-L) and (2-L-R) that surround the lenses combined with sun/wind screens according to current application, showing rewinding and deploying systems (9-L) and (9-R) installed inside voids (10) of the lower glasses frames (2-L-L), (2-L-R). Each void (10) is formed by two broad plates (9-7) and two narrow plates (9-8).

Two narrow plates form a left lower slit (5-L-L), through which left front face covering screen (7-F-F-L) comes in and out of the left lower glass frame (2-L-L). Another two narrow plates form a right lower slit (5-L-R), through which right front face covering screen (7-F-F-R) comes in and out of the left lower glass frame (2-L-L).

Figure 9:
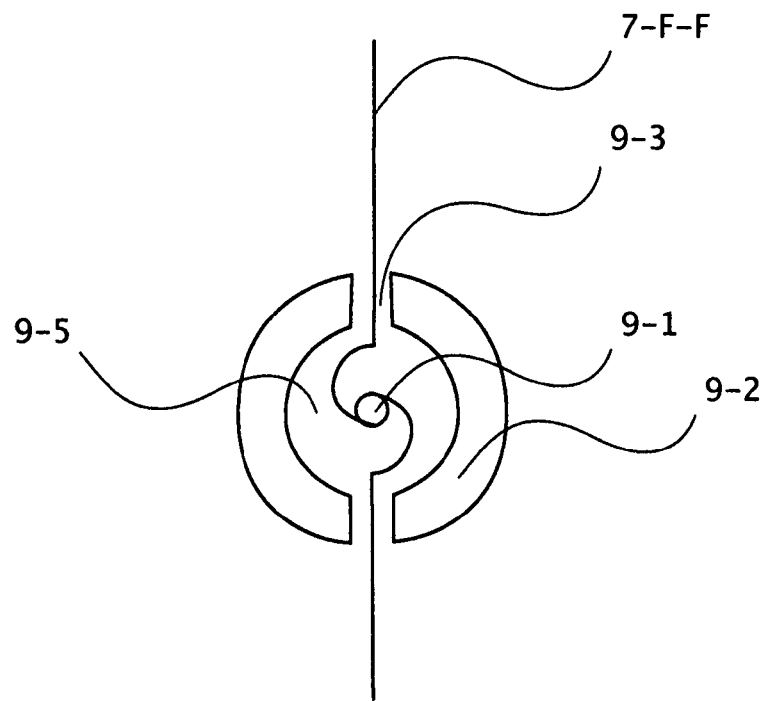
FIG. 9 is an enlarged cross-sectional view of rewind and deploying system for lower part of glass frame that surround the lenses seen along the line C-C' in FIG. 8.
Figure 10:
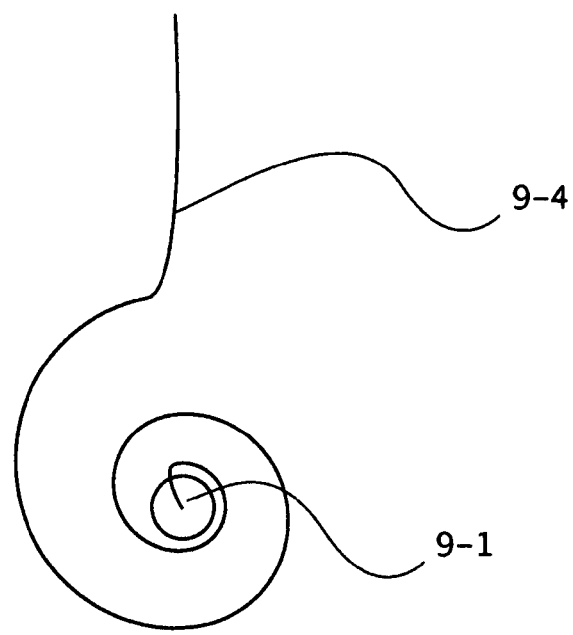
FIG. 10 is an enlarged cross-sectional view of rewind and deploying system for lower part of glass frame that surround the lenses seen along the line D-D' in FIG. 8.

FIG. 9 is an enlarged cross-sectional view of a rewind and deploying system (9) for lower glasses frames (2-L-L) and (2-L-R) that surround the lenses seen along the line C-C' in FIG. 8. FIG. 10 is an enlarged cross-sectional view of a rewind and deploying system (9) for lower glasses frames (2-L-L) and (2-L-R) that surround the lenses seen along the line D-D' in FIG. 8.

The rewinding and deploying system (9) is comprised of one center shaft (9-1), to which front face covering screen (7-F-F) is firmly attached, one hollow tube (9-2) that has a long slits (9-3) along the length thereof, through which the front face covering screen (7-F-F) comes out respectively, and two swirled ribbon springs (9-4) that are installed on both ends of the center shaft (9-1). A space (9-5) is developed between the center shaft (9-1) and the hollow tube (9-2) to receive the wound front face covering screen (7-F-F). One swirled ribbon spring (9-4) on one end of the center shaft (9-1) is engaged to a hole (9-6) that is developed inside of one narrow end of the space (10). Other swirled ribbon spring (9-4) on other end of the center shaft (9-1) is engaged to a hole (9-6) that is developed inside of other narrow end of the space (10).

Lower left slit (5-L-L) and front left face pulls (6-F-F-L) are covered with solid lower left cover (4-L-L). The lower left cover (4-L-L) is rotate-ably attached to left broad plates (9-7-L), which faces the wearer's face, via three hinges (3-4). Lower right slit (5-L-R) and front right face pulls (6-F-F-R) are covered with lower right cover (4-L-R). The lower right cover (4-L-R) is rotate-ably attached to right broad plates (9-7-R), which faces the wearer's face, via three hinges (3-4).

Figure 11:
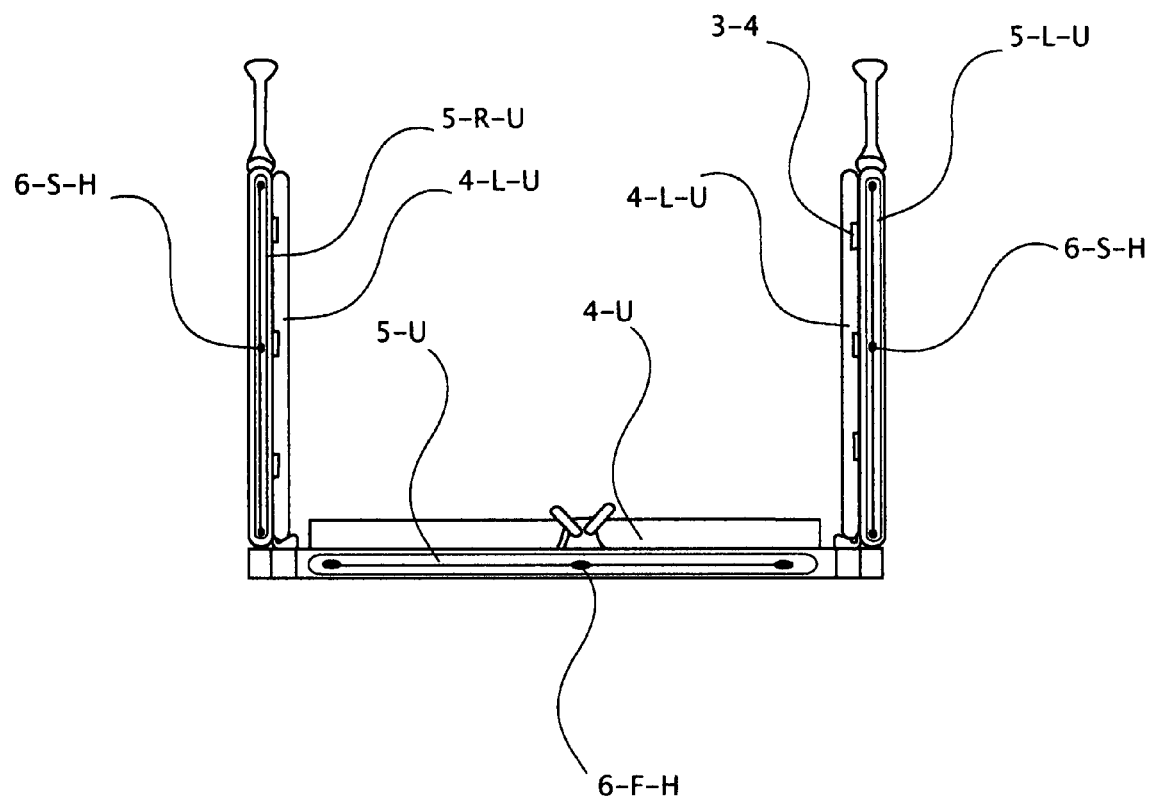
FIG. 11 is an over view of the glasses combined with sun/wind screens according to current application, when the hair covering screens is retracted inside of the glasses.

FIG. 11 is an over view of the glasses combined with sun/wind screens according to current application, when the front hair covering screen (7-F-H) and side hair covering screens (7-S-H) are retracted inside of the glasses. Side hair covering screens (7-S-H) are again divided into left side hair covering screen (7-S-H-L) and right side hair covering screen (7-S-H-R). Right hair covering screen (7-S-H-R) comes in and out through upper right leg slit (5-L-U-R).

Figure 12:
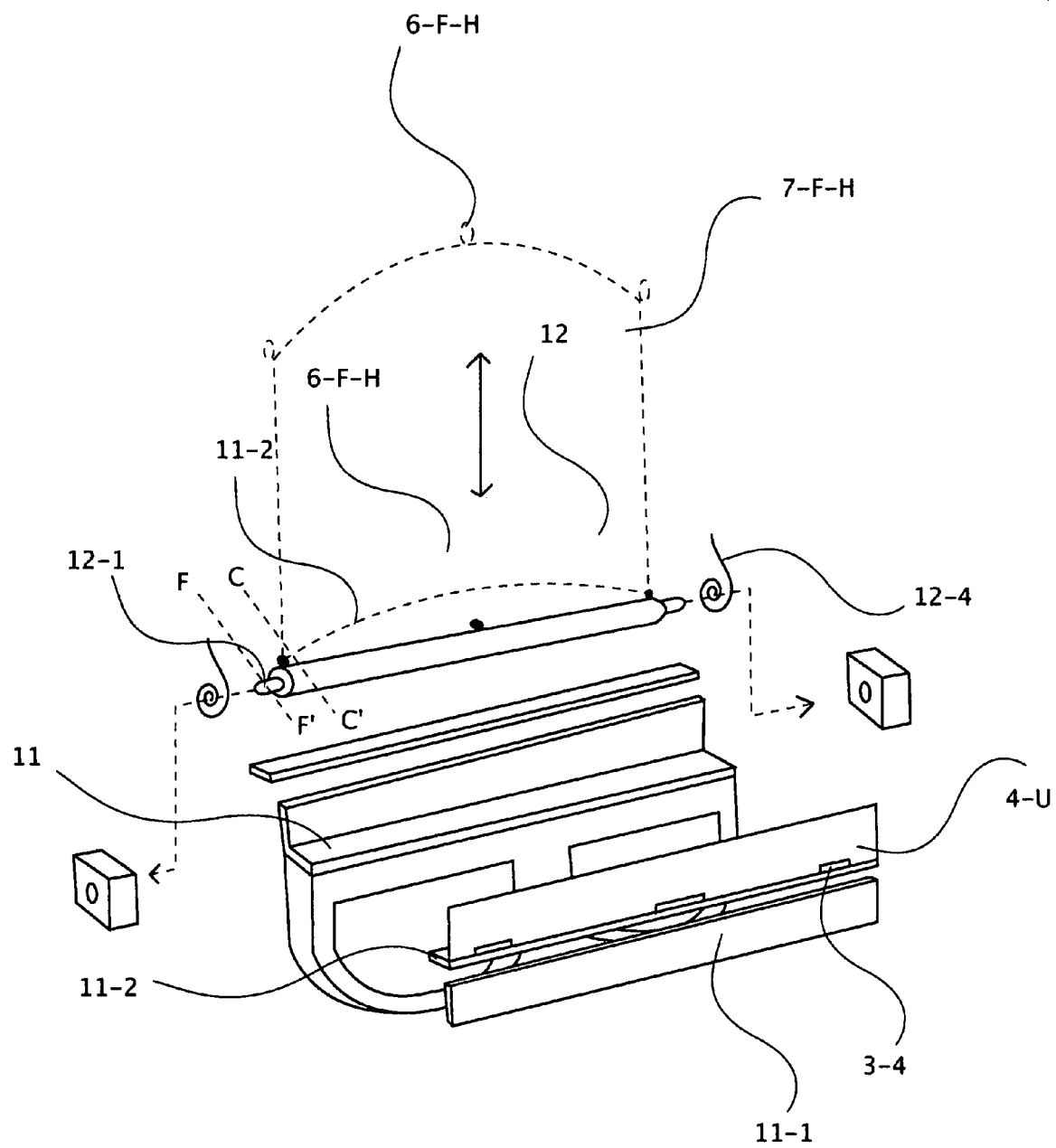
FIG. 12 is an exploded view of the glasses combined with sun/wind screens according to current application, showing rewinding and deploying system installed inside of the upper glasses frame thereof.

FIG. 12 is an exploded view of the glasses (1) combined with sun/wind screens according to current application, showing rewinding and deploying system for front hair covering screen (7-F-H) installed inside void (11) of the upper glasses frame (2-U) thereof. The void (11) is formed by two broad plates (11-1) and two narrow plates (11-2). Two narrow plates (11-2) forms the upper slit (5-U), through which the front face covering screen (7-F-F) comes in and out of the upper glass frame (2-U).

Figure 13:
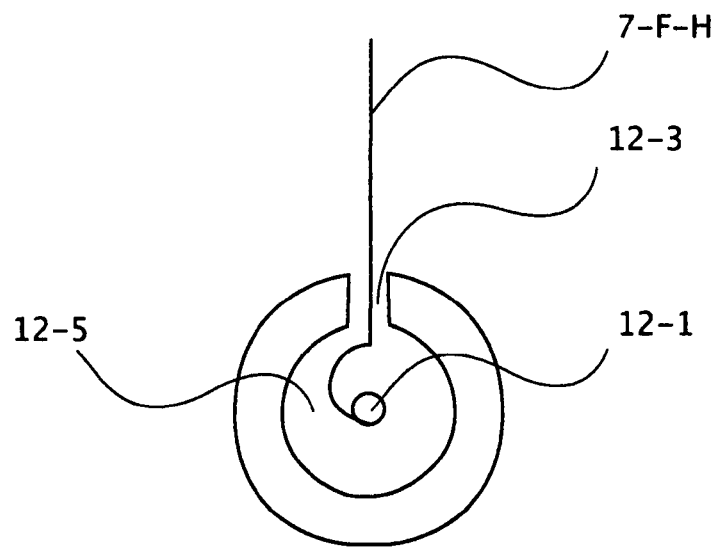
FIG. 13 is an enlarged cross-sectional view of rewind and deploying system for upper glass frame seen along the line E-E' in FIG. 12.
Figure 14:
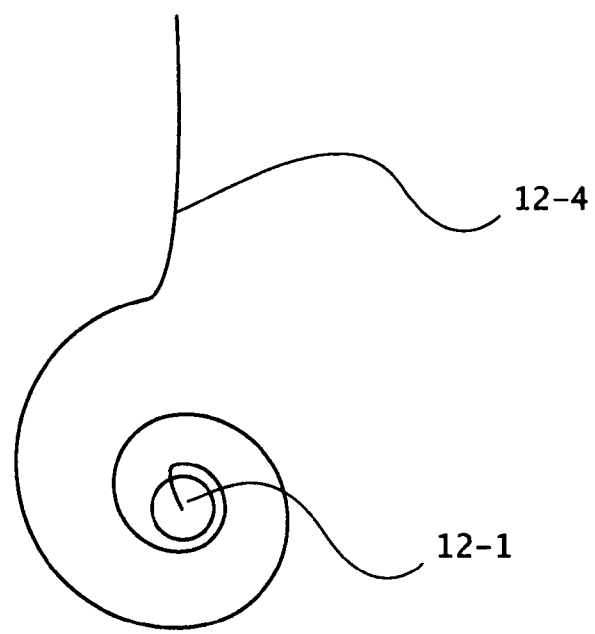
FIG. 14 is an enlarged cross-sectional view of rewind and deploying system for upper glass frame seen along the line F-F' in FIG. 12.

FIG. 13 is an enlarged cross-sectional view of rewind and deploying system for upper glass frame seen along the line E-E' in FIG. 12. And FIG. 14 is an enlarged cross-sectional view of rewind and deploying system for upper glass frame seen along the line F-F' in FIG. 12. The rewinding and deploying system (12), for front hair covering screen (7-F-H), is comprised of one center shaft (12-1), to which front hair covering screen (7-F-H) is firmly attached, one hollow tube (12-2) that has a long slit (12-3) along the length thereof, through which the front hair covering screen (7-F-H) comes out, and two swirled ribbon springs (12-4) that are installed on both ends of the center shaft (12-1). A space (12-5) is developed between the center shaft (12-1) and the hollow tube (12-2) to receive the wound front hair covering screen (7-F-H). One swirled ribbon spring (12-4) on one end of the center shaft (12-1) is engaged to a hole (12-6) that is developed inside of one narrow end of the space (11). Other swirled ribbon spring (12-4) on other end of the center shaft (12-1) is engaged to a hole (12-6) that is developed inside of other narrow end of the space (11). Upper slit (5-U) and front hair pulls (6-F-H) are covered with an upper cover (4-U). The upper cover (4-U) is rotate-ably attached to one of the broad plates (11-1), which faces the wearer's face, via three hinges (3-4).

What is claimed is:

1. A glasses combined with sun/wind screens comprises of:

an upper glasses frame, which has a void space that is formed by assembling two broad plates and two narrow plates that are placed on the upper face of the upper glasses frame to form an upper slit through which a front hair covering screen comes in and out thereof, and two lower glasses frames of left lower frame and right lower frame, each of them has a void that is formed by two broad plates and two narrow plates that are placed on the lower face of the lower glasses frame to form a lower slit, through which front face covering screen comes in and out thereof, and two leg frames of a left leg frame and a right leg frame, each of them has a void space that is formed by assembling two broad plates and four narrow plates, two of the narrow plates are placed on the lower face of one leg frame to form a lower leg slit through which one cheek covering screen comes in and out thereof and another two narrow plates are placed on the upper face of the leg frame to form an upper leg slit through which a side hair covering screen comes in and out thereof, and a solid upper cover, which hides an upper slit and three small head pulls those are installed inside of the upper glass frame, and four solid leg covers, two of them cover upper leg slits and three small side hair pulls and the other two cover lower leg slits and three small cheek pulls, and two solid lower covers, each of them covers lower slit and front face pulls, and twenty one hinges, each three of them rotatably attach the solid cover to the respective frame, and a front hair covering screen, which comes out of the upper face of the upper glasses frame, and two cheek covering screens, each of which comes out of the lower face of each leg frames, and two side hair covering screens, each of which comes out of the upper face of each leg frames, and two front face covering screens, each of which comes out of the lower face of lower glasses frames, and three small front hair pulls, which are small metal hooks and attached on one end of the front hair covering screen, and six small cheek pulls, which are small metal hooks and each three of them are attached one end of one cheek covering screen, and six small side hair pulls, which are small metal hooks and each three of them are attached one end of one side hair covering screen, and six small front face pulls, which are small metal hooks and each three of them are attached one end of one front face covering screen, and one front hair screen rewinding and deploying system, which is comprised of;

one center shaft, to which the front hair covering screen is firmly attached, and one hollow tube that has a long slit along the length thereof, through which the front face covering screen comes out, and two swirled ribbon springs that are installed on both ends of the center shaft and one of the swirled ribbon spring that locates on one end of the center shaft is engaged to a hole that is developed inside of one narrow end of the space and the other swirled ribbon spring located on the other end of the center shaft is engaged to another hole that is developed inside of other narrow end of the space, and two screen rewinding and deploying systems, each of which is installed inside of the leg frames and comprised of;

one center shaft, to which one cheek covering screen and one side hair covering screen are firmly attached, and one hollow tube that has one upper slit and one lower slit along the length thereof; through the upper slit the side hair covering screen comes in and out and through the lower slit the cheek covering screen comes in and out, and two swirled ribbon springs that are installed on both ends of the center shaft and one of the swirled ribbon spring that locates on one end of the center shaft is engaged to a hole that is developed inside of one narrow end of the space and the other swirled ribbon spring located on the other end of the center shaft is engaged to another hole that is developed inside of other narrow end of the space, and two front face screen rewinding and deploying systems, each of them is comprised of;

one center shaft, to which the front face covering screen is firmly attached, and one hollow tube that has a long slit along the length thereof, through which the front face covering screen comes out, and two swirled ribbon springs that are installed on both ends of the center shaft and one of the swirled ribbon spring that locates on one end of the center shaft is engaged to a hole that is developed inside of one narrow end of the space and the other swirled ribbon spring located on the other end of the center shaft is engaged to another hole that is developed inside of other narrow end of the space.

2. A glasses combined with sun/wind screens of claim 1, wherein all the screens are made of gauze.

3. A glasses combined with sun/wind screens of claim 1, wherein all the screens are made of satin.

4. A glasses combined with sun/wind screens of claim 1, wherein all the screens are made of veil.

* * * * *